Aug. 25, 1925.

H. P. MACDONALD

FLEXIBLE DISK

Filed Jan. 19, 1920

1,551,517

2 Sheets-Sheet 1

WITNESS:

INVENTOR
Harry P. Macdonald
BY
Synnestvedt & Lechner
ATTORNEYS.

Aug. 25, 1925.

H. P. MACDONALD

FLEXIBLE DISK

Filed Jan. 19, 1920

WITNESS:

INVENTOR
Harry P. Macdonald
BY
Synnestvedt & Lechner
ATTORNEYS.

Patented Aug. 25, 1925.

1,551,517

UNITED STATES PATENT OFFICE.

HARRY P. MACDONALD, OF MONTCLAIR, NEW JERSEY, ASSIGNOR, BY MESNE ASSIGNMENTS, TO SPICER MANUFACTURING CORPORATION, OF SOUTH PLAINFIELD, NEW JERSEY, A CORPORATION OF VIRGINIA.

FLEXIBLE DISK.

Application filed January 19, 1920. Serial No. 352,477.

*To all whom it may concern:*

Be it known, that I, HARRY P. MACDONALD, a citizen of the United States, residing at Montclair, in the county of Essex and State of New Jersey, have invented certain new and useful Improvements in Flexible Disks, of which the following is a specification.

This invention relates to flexible disks suitable for use in flexible joints for torque transmission assemblies, the invention being particularly useful in connection with joints for automotive propeller assemblies.

One of the primary objects of my invention is the provision of a disk of superior strength and wearing qualities; the provision of an improved disk in which the strength and elasticity thereof are substantially the same in all parts of the disk; the provision of an improved disk in which the material is disposed in such manner that substantially all portions thereof are subjected to and withstand stresses alike; the provision of an improved disk which may be constructed in such manner that wastage of material is practically eliminated; and the provision of an improved disk, the parts of which are so disposed, that the manufacture thereof is greatly simplified and the disks turned out in quantity very economically.

The foregoing, together with such objects as may hereinafter appear, or are incident to my invention, I obtain by means of a construction which I have illustrated in preferred form in the accompanying drawings, wherein—

Figure 1:
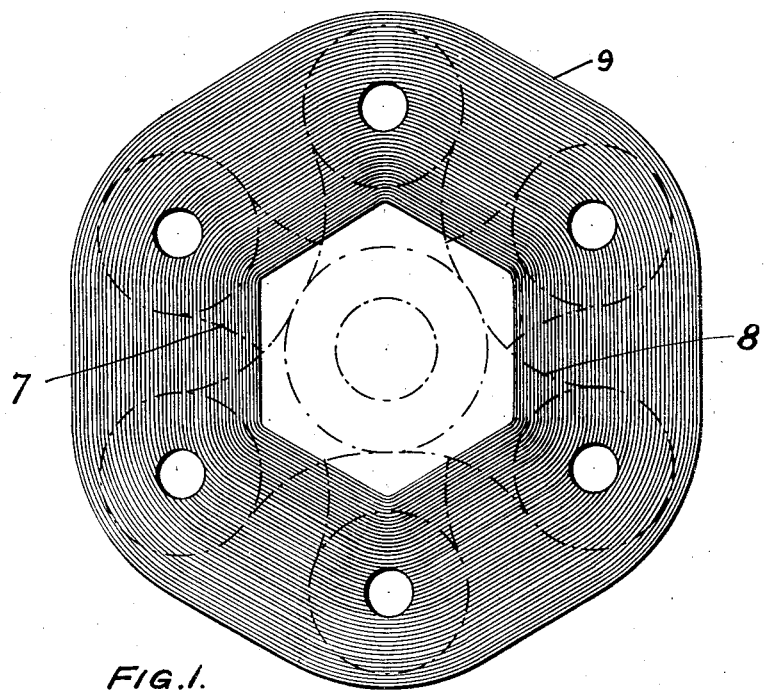
Figures 2, 3:
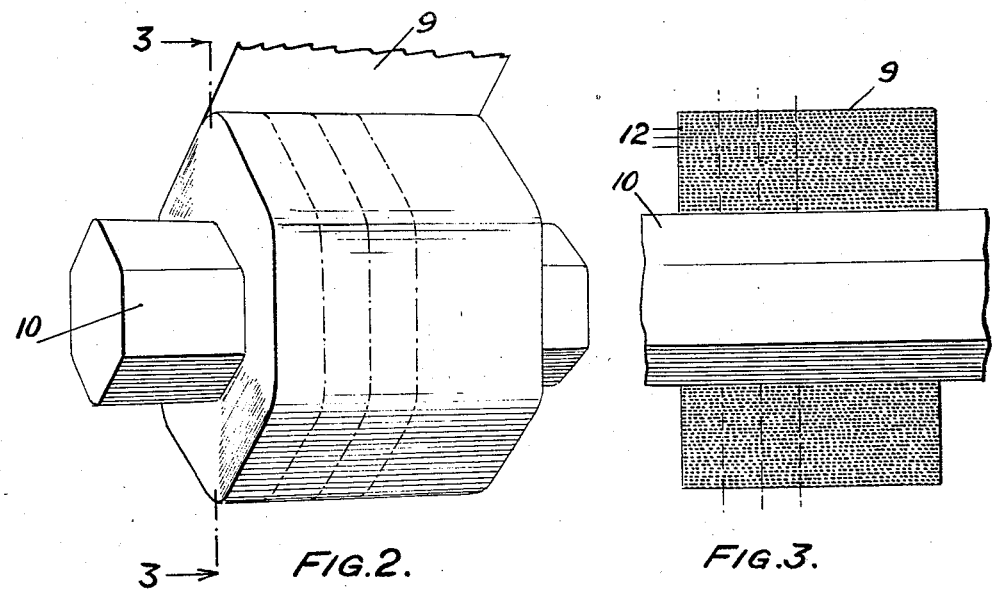
Figure 4:
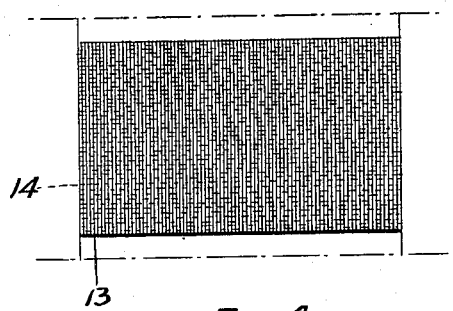
Figure 5:
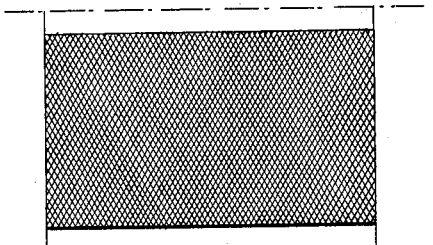
Figure 6:
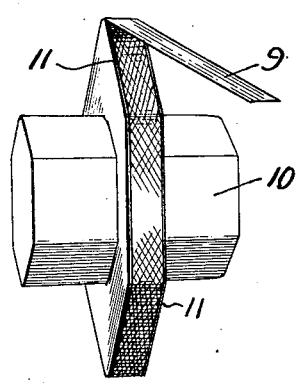
Figure 7:
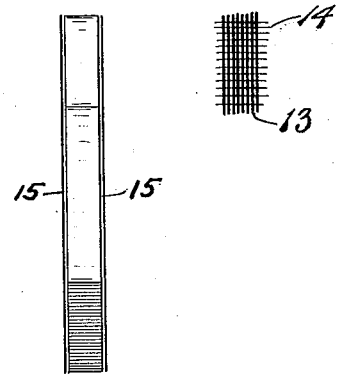
Figure 11:
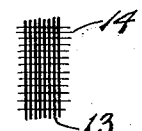
Figure 9:
Figure 8:
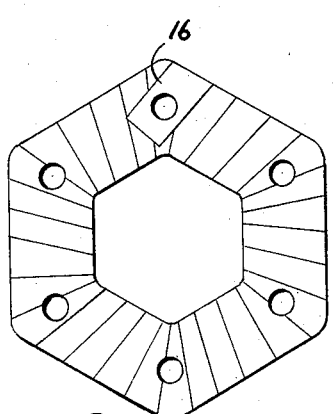
Figure 10:
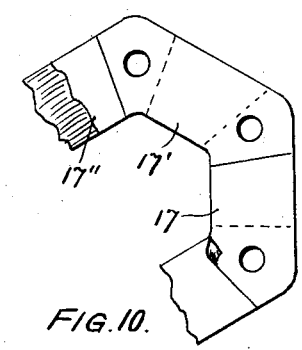

Figure 1 is a diagrammatic illustration of a disk comprising one embodiment of my invention, with the spider members of the joint indicated in dotted lines; Figure 2 is a perspective view illustrating one method of making the disks shown in Figure 1; Figure 3 is a section on the line 3—3 of Figure 2; Figure 4 and Figure 5 are fragmentary views diagrammatically illustrating different ways in which the threads of the fabric may be disposed; Figure 6 is a perspective view illustrating a different way of making the disk shown in Figure 1 and also a slightly modified form of disk; Figure 7 is a side elevation of a disk embodying another modification of my invention; Figure 8 is a side elevation of a disk embodying still another modification of my invention; Figure 9 is a cross section through a disk in which I have substituted cord for fabric; Figure 10 is a fragmentary side elevation of a disk illustrating still another modification of my invention; and Figure 11 is a fragmentary diagrammatic view of another modification.

Referring to Figure 1, the joint, of which one or more of the disks forms or form a part, includes a pair of spider members 7 and 8, or their equivalents, each one of which is secured to an end of the shafting to be coupled, and the disk or disks is or are provided with a plurality of holes, usually six in number for the reception of the bolts (not shown) which serve to couple the disks to the respective spiders. The torque transmitting stresses are, therefore, primarily in straight lines, substantially parallel to the lines intersecting the centers of the bolt holes.

Generally speaking there are in use two types of fabric disks for such purposes. In one type, the disks are cut from sheets of fabric, the threads of which are parallel with or at right angles to each other, and in the other the different plies of fabric composing the disk are laid out on top of each other in such a way that the threads of one layer make an angle with the threads of the other layers.

One disadvantage incident to the first type of construction is that a disk built up in this way has unequal strength and also unequal elasticity between the various holes through which the bolts pass, this resulting from the fact that in some portions of the disk the stress on the disk is parallel or substantially parallel to one of the rows of threads of the fabric and at right angles to the other, as a consequence of which, the first mentioned threads take all of the strain and the others are idle which results in a weak section and minimum elasticity. In another portion, for example, the stresses are at an angle of 45 degrees to the crossing threads of the fabric so that each set of threads would carry the strain equally, thereby giving increased strength and elasticity, but owing to the fact that other sections of the same disk have lesser strength and elasticity, failure of the disks will naturally occur in the weakest portions thereof, and even if there be no positive failure there is a marked tendency of the disk to become distorted by reason of the unequal elasticity or stretching.

In the second type of disk the different layers of fabric over a given portion of the disk will have different strengths and elasticity, for one layer, between adjacent bolts holes, may have the threads parallel and at right angles to the stress, while the others at such points may have the threads at an angle to themselves, so that the fabric is not employed in the most advantageous manner and the stress of the disk must necessarily be kept low to prevent a rupture to those layers of fabric which have the least elasticity and strength.

To overcome the foregoing objections and to obtain the advantages and ends herein set forth, I propose to build up a disk radially as by winding rubberized fabric around a mandrel until the depth of the fabric so wound equals the desired width of the disk. This will ensure each separate layer of fabric having its threads in exactly the same relation to the stress as the layer underneath it so that all layers will carry the stress equally. The fabric in such a disk is thus substantially in the form of a spiral or volute and when completed each disk is vulcanized, preferably with a good coating of rubber.

The tape or band of fabric which is to be wound on the mandrel may be of the width corresponding to the thickness of the disk to be made, as shown for example in Figure 6. In this figure the tape is indicated at 9, and the mandrel at 10, such mandrel being preferably hexagonal, so as to produce a substantially hexagonal disk in which the layers of fabric from bolt hole to bolt hole would extend in planes substantially parallel to a line cutting the centers of the bolt holes. This arrangement is to be preferred to a truly circular disk, although of course the latter form comes within my invention. Where the tape or band is of a width corresponding to the thickness of the disk to be formed, it may be desirable to have selvage 11 at the edges for purposes of reinforcement.

The tape or band may also be in the form indicated in Figure 2, that is the width thereof may be a multiple of the thickness of the disk to be made, and after the tape has been wound on the mandrel 10, it is sliced into disks of the requisite thickness, preferably before vulcanization. The layers of fabric are indicated by the dotted lines 12 in Figure 3.

The threads of the fabric may be arranged in any desired manner. Thus for example, as indicated in full lines in Figure 4, the warp threads 13, and the weft or woof threads indicated at 14 in dotted lines, extend at right angles to each other with the warp threads running circumferentially of the disk i. e. parallel to the faces of the disk. The warp threads may be made heavier than the weft threads.

In Figure 5, I have shown the warp and weft threads extending at angle of substantially 60 degrees with respect to each other as a result of which both sets of threads equally withstand the torque transmitting stresses. By this arrangement the disk has the greatest strength circumferentially because the pull on threads is more direct, while transversely it is considerably more elastic so that the disk accommodates itself very well to the slight flexure which may be present when the shafting is out of alinement, as is the case in automobile drives where the rear axle drive shaft extends at an angle with reference to the gear box drive shaft.

In Figure 6, I have also shown the threads running at an angle to each other, and it will be readily understood that regardless of the arrangement of the threads, the strength and elasticity of each part of the disk is the same as in the remaining portions thereof.

In some instances it may prove desirable to add a facing of rubberized fabric cut out to the shape of the disk and laid upon the disk before vulcanization. Such an arrangement is indicated in Figure 7 at 15. In lieu of providing a facing, the disk may be wrapped by tape such as indicated at 16 in Figure 8, somewhat after the manner in which tires are wrapped with paper for shipping. When a disk is wrapped in this manner it will be seen that it is readily possible to increase the thickness of the winding at points adjacent the bolt holes so as to increase the strength of such portions.

In Figure 10 I have shown the disk as being wound with sheets of fabric 17, 17', 17'', etc., with the ends of the sheets overlapping thus giving double thickness at the bolt holes.

Instead of forming the disk from a tape of fabric, cord may be wound upon the mandrel in the manner indicated in Figure 9 and afterwards vulcanized, and in some instances it may be desirable to stitch the layers.

It will be seen from the foregoing that I have produced a disk which is very simple to manufacture and in the manufacture of which there is no loss from wastage of material. The disk when formed has the various physical properties and characteristics above noted.

I also propose in some instances to use heavy warp threads 13, relatively closely spaced, and lighter weft threads 14, more widely spaced as indicated in Figure 11. The warp threads may also be twisted to give maximum elasticity.

I claim:
1. A disk for torque transmission joints composed of a member wound on itself somewhat in the nature of a helix or volute and bound together.

2. A disk for torque transmission joints composed of a member wound on itself somewhat in the nature of a helix or volute and vulcanized together.

3. A disk for torque transmission joints composed of layers of suitable material extending circumferentially of the disk and in planes substantially at right angles to the sides of the disk.

4. A disk for torque transmission joints composed of suitable fabric or the like built to the form of the disk, such fabric extending substantially transversely of the sides of the disk.

5. A disk for torque transmission joints composed of means extending circumferentially of the disk and built into the form of a disk.

6. A disk for torque transmission joints composed of fabric or other suitable material disposed in such manner that all portions of the disk are of substantially the same strength and elasticity.

7. A disk for torque transmission joints built up of fabric or other suitable material disposed so as to resist the stresses substantially alike in subtantially all portions thereof.

8. A disk for torque transmission joints built up of fabric or other suitable material extending circumferentially and transversely of the disk, and means reinforcing the disk.

9. A disk for torque transmission joints built up of fabric or other suitable material extending circumferentially and transversely of the disk, and means reinforcing the disk along a face thereof.

10. A disk for torque transmission joints composed of vulcanized fabric, the threads of which cross each other at acute angles one way of the fabric and at obtuse angles the other way of the fabric.

11. A disk for torque transmission joints composed of layers of fabric extending circumferentially and transversely of the disk, the threads of the fabric crossing each other at acute angles one way thereof and at obtuse angles the other way.

12. The disk for a flexible universal joint which includes a layer composed of substantial peripheral concentric cords embedded in frictional material.

13. The disk for a flexible universal joint which includes a layer composed of cord wound in a flat helix and secured together by frictioning material.

In testimony whereof, I have hereto signed my name.

HARRY P. MACDONALD.